US012403385B2

(12) United States Patent
Tan

(10) Patent No.: US 12,403,385 B2
(45) Date of Patent: Sep. 2, 2025

(54) ADAPTIVE CONTROL OF ELECTRIC SKATEBOARD

(71) Applicant: Sicheng Tan, Sugar Land, TX (US)

(72) Inventor: Sicheng Tan, Sugar Land, TX (US)

( * ) Notice: Subject to any disclaimer, the term of this patent is extended or adjusted under 35 U.S.C. 154(b) by 0 days.

(21) Appl. No.: 18/235,332

(22) Filed: Aug. 17, 2023

(65) Prior Publication Data

US 2025/0058204 A1 Feb. 20, 2025

Related U.S. Application Data

(60) Provisional application No. 63/399,212, filed on Aug. 18, 2022.

(51) Int. Cl.
*A63C 17/12* (2006.01)
*A63C 17/00* (2006.01)
*H02K 11/215* (2016.01)
*A63C 17/01* (2006.01)

(52) U.S. Cl.
CPC .......... *A63C 17/12* (2013.01); *A63C 17/0046* (2013.01); *H02K 11/215* (2016.01); *A63C 17/01* (2013.01); *A63C 2203/12* (2013.01); *A63C 2203/22* (2013.01); *A63C 2203/24* (2013.01)

(58) Field of Classification Search
CPC ...... A63C 17/12; A63C 17/01; A63C 2203/12
See application file for complete search history.

(56) References Cited

U.S. PATENT DOCUMENTS

| | | | |
|---|---|---|---|
| 2016/0184690 A1* | 6/2016 | Aders | A63C 17/262 180/20 |
| 2017/0007910 A1* | 1/2017 | Ruschkowski | A63C 17/12 |
| 2017/0144056 A1* | 5/2017 | Evans | A63C 17/012 |
| 2018/0104567 A1* | 4/2018 | Treadway | A63C 17/265 |
| 2018/0147478 A1* | 5/2018 | Wood | B60L 50/60 |
| 2018/0250581 A1* | 9/2018 | Lemire-Elmore | A63C 17/015 |
| 2018/0278190 A1* | 9/2018 | Cerboneschi | H02P 23/0077 |
| 2018/0280787 A1* | 10/2018 | Wahba | B60K 7/0007 |
| 2019/0061557 A1* | 2/2019 | Quick | B60K 7/0007 |
| 2019/0250615 A1* | 8/2019 | Gillett | A63C 17/12 |
| 2022/0241676 A1* | 8/2022 | King | A63C 17/002 |

* cited by examiner

*Primary Examiner* — Brian L Swenson

(57) ABSTRACT

An electronic control device for an electric skateboard that obviates the need for remote control is described. The device includes one or more hub motor integrated into a wheel hub or coupled to an axle of the electric skateboard and electric control unit that detects speed or acceleration of the hub motor and adaptively controls speed or torque of the hub motor based on feedback from rider's manual operation of the skateboard.

17 Claims, 6 Drawing Sheets

ADAPTIVE CONTROL OF ELECTRIC SKATEBOARD

CROSS-REFERENCE TO RELATED APPLICATION

This application claims the benefit of and priority to U.S. Provisional Application Ser. No. 63/399,212, filed Aug. 18, 2022.

BACKGROUND

E-mobility solutions such as Segway, e-scooter, unicycle, and electric skateboard (e-skateboard) are increasing in popularity. Electric skateboards are appealing for consumers who value portability due to its light weight and small form factor. Moreover, electric skateboards can give riders nuanced control not readily available with other e-mobility solutions. Electric skateboards also have the option to quickly switch from manual or electric propulsion or a combination of both.

One drawback of skateboards (manual or electric) is the steep learning curve. Due to the "slippery" nature of skateboards (i.e., low resistance of friction), it can be challenging for beginning riders to get on safely or stably. One possible solution is to use braking control to stabilize the e-skateboard before rolling. Activation of braking control would be initiated by the rider using, for example, a remote controller.

However, this non-adaptive approach can be difficult to implement because the startup process would be very battery-consuming or require a high-power-rated motor to ramp up speed from zero without the help of manual propelling force. Compact motors such as hub motors generally have low-power-ratings.

Operating electric skateboard by remote controller can also pose other challenges for beginning riders. Due to bandwidth limitations (i.e., limited wireless data transmission rate between electric control unit and remote controller), using a handheld remote to perform basic maneuvers can be clunky, slow, or challenging to safely coordinate. Sudden stopping may be particularly difficult to execute safely with a handheld remote. Remote braking may also be susceptible to faulty triggering while the skateboard is moving fast.

SUMMARY

In one aspect, the present invention relates to an electronic control device for an electric skateboard that obviates the need for remote control, the device comprising: one or more hub motor integrated into a wheel hub or coupled to an axle of the electric skateboard; and electric control unit that detects speed or acceleration of the hub motor and adaptively controls speed or torque of the hub motor based on feedback from rider's manual operation of the skateboard.

In another aspect, the present invention relates a method of adaptive control of an electric skateboard without use of a separate controller, the method comprising: providing an electronic control device comprising an electric control unit and a power battery, wherein the electric control unit is coupled of a hub motor installed on the electric skateboard, wherein the electronic control device is configured with an algorithm that calculates one or more parameters of the electric skateboard and provides a compensation input to the hub motor.

DETAILED DESCRIPTION

The present disclosure relates to electronic control device for adaptive control of electric skateboard and method of using the same. The adaptive control utilized herein is seamless in that it provides electric control of the electric skateboard without requiring the use of a handheld controller (e.g., remote controller). As a result, dynamic compensations (e.g., new target speed of the skateboard) made by the electronic control device are instant and automated.

In one aspect, the electronic control device provides adaptive control of the electric skateboard while obviating the need for a remote controller to operate the electric skateboard. Additionally, the electronic control device provides safety features such as providing control architecture that prevents unexpected acceleration of the electric skateboard as well as utilizing a finite state machine to manage the state flow of the electronic control device, and calculating measurables (e.g., speed, acceleration, electrical torque) sensed from the skateboard. Moreover, the electronic control device of this disclosure can provide accurate estimates of key parameters (e.g., weight) thus obviating the need for sensors (e.g., weight sensors) that can add cost.

References will now be made to the embodiments shown in the figures. It should be understood that the shown embodiments are not intended to be limiting. Embodiments not explicitly shown in the figures may also be compatible with the present disclosure.

Figure 1A:
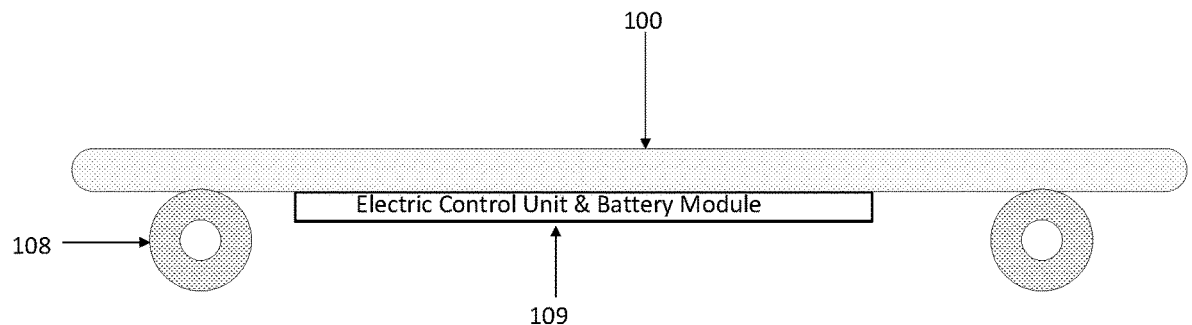
FIG. 1A shows an electric skateboard equipped with electronic control unit and battery module in accordance with the present disclosure.

Referencing FIG. 1A, an electric skateboard 100 of the present disclosure is equipped with an electronic control device comprising an electric control unit 102, power battery 104, and one or more electric hub motors 108. The hub motor 108 is integrated into the wheel hub and/or coupled to an axle of the electric skateboard 100 and is controlled by the electric control unit 102. In some embodiments, the electronic control device further includes a power switch that turns the electronic control device on or off. In some additional embodiments, the electronic control device further includes a man-machine interface display that can summarize data, allow rider to access programmable features, and the like.

As shown, power battery 104 powers the electric control unit 102 and may be housed together in an electric control unit & battery module housing 109. Alternatively, the electronic control unit 102 and the power battery 104 may be housed in separate housings or enclosures.

The electric control unit 102 can convert electrical power to mechanical power or mechanical power to electrical power. The direction of power conversion between the hub motor 108 and power battery 104 may depend on a number of factors, such as the skateboard's running mode. For example, when the hub motor 108 propels the skateboard 100 to speed up, the electric control unit 102 discharges the power battery 104 to drive the hub motor 108 and converts battery power to mechanical power. When the skateboard 100 slows down the hub motor 108 by braking control, the hub motor 108 can act as an alternator to convert mechanical energy to electrical energy, allowing the electric control unit 102 to recharge the power battery 104.

For a conventional electric skateboard, the electric control unit 102 drives 1 to 4 hub motors and may include a corresponding number of DC-AC converters 106 in the same electric control board. The DC-AC converter 106 converts DC voltage from the power battery 104 to an AC voltage and provides AC current and voltage to hub motor(s) 108 to drive the electric skateboard 100.

In some instances, the electric control unit 102 may include a cooling mechanism 110, such as a heatsink, fans, coolant lines, and the like. The cooling mechanism 110 may be at least partially integrated into the housing of the electric control unit 102. The exact cooling mechanism used may be a function of several factors such as packaging constraints and efficiency of the electric control unit 102. The cooling mechanism may be configured to reduce the operating temperature of the DC-AC converter 106. The electric control unit 102 monitors the battery DC voltage bus 112. Battery charging progress can be shown via, for example, blinking LED 114 embedded in the housing 109.

Figure 2:
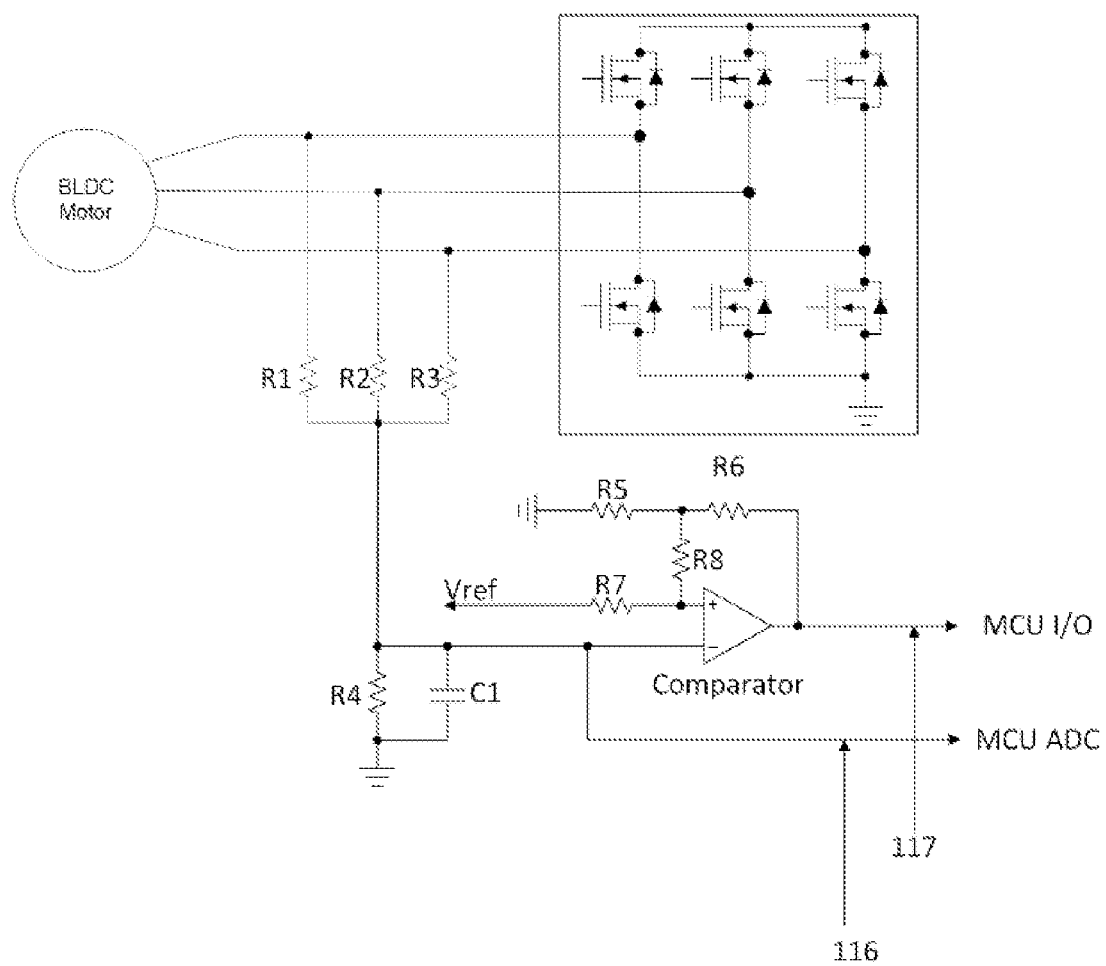
FIG. 2 shows a circuit diagram in accordance with the present disclosure.

Back-EMF sensing module 115 can provide two function signals (116 and 117) into the microcontroller unit (MCU) 111. First function signal is the back-electromotive-force (BEMF) signal 116. Second function signal is a wakeup signal 117 extracted from the BEMF signal 116. The BEMF signal 116 is connected to the MCU ADC pin while the wakeup signal 117 is connected to the MCU digital input-output pin. FIG. 2 provides a diagram of a circuit that routes the two function signals 116 and 117 to the MCU 111.

Referring to FIG. 2, resistors (R1, R2, R3) connect to the motor terminal for three phase terminal voltage sensing. Resistor R4 combines the three terminal voltages together and scales the voltage level down to feed into the negative input of the comparator. C1 is the filter capacitor acting as part of the low pass filter together with R4. The reference voltage (Vref) provides the voltage level for the comparator output to flip to high or low voltage. And resistors R5 and R6 define the hysteresis window of the comparator needed to filter out the unexpected high frequency flip-flop output. The hysteresis window is added to Vref via R8.

The microcontroller unit 111 can also convert DC voltage from the power battery 104 to AC voltage and allows various control algorithms for motor control to be implemented. For example, motor current sensing module 113 provides feedback of the motor phase current to the microcontroller unit 111 to regulate motor torque. The microcontroller unit 111 can also leverage data from the sensing modules 113 and 115 to estimate observable motor outputs such as speed, acceleration, and torque. Slope sensing module 103 can be used to compensate for skateboard tilt angle 601.

Figure 3A:
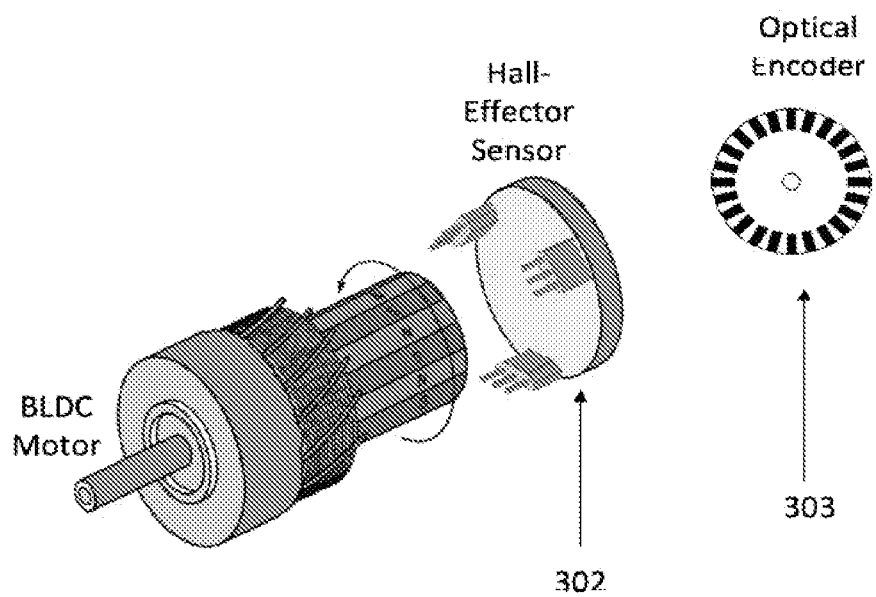
FIG. 3A shows a BLDC motor, Hall-Effector Sensor, and Optical Encoder in accordance with the present disclosure.

Referencing FIG. 3A, a brushless DC (BLDC) motor can be used as a hub motor 108. Other motors (e.g., DC motors) can be used as well. The BLDC motor can be equipped with a speed or position sensor such as a Hall-Effector sensor 302. FIG. 3A shows a BLDC with three Hall-Effector sensors embedded. Alternatively, an optical encoder 303 can be used in place of the Hall-Effector sensors.

The signal from the Hall-Effector sensor 302 (or optical encoder) can be one of the direct outputs from the sensors or an indirect output after the direct outputs are combined or buffered by a logic circuit.

Figure 3B:
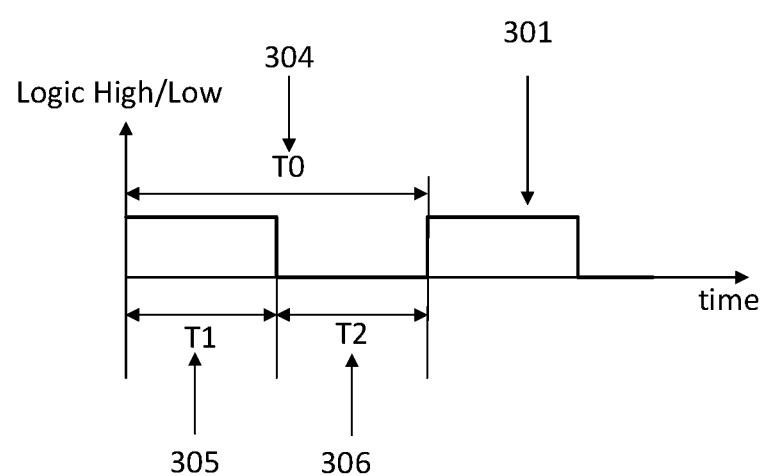
FIG. 3B shows a logic circuit in accordance with the present disclosure.

Referencing FIG. 3B, Hall-Effector signal 301 features a series of pulses with period T0 304 in proportion to the spinning speed of the motor. The period T0 304 itself is the sum of high level period T1 305 and low level period T2 306. When the Hall-Effector signal 301 is fed into a GPIO pin of the microcontroller unit 111 or a pin with special features to capture the rising edge or falling edge of a pulse by the microcontroller unit 111, the signal is able to function the same as the wakeup signal 117 and processed the standby mode 301 accordingly. Meanwhile, by monitoring the signal period T0 304, high level period T1 305, low level period T2 306, either separately or collectively, the spinning speed of the hub motor 108 can be observed via the BEMF signal 116.

Figure 4:
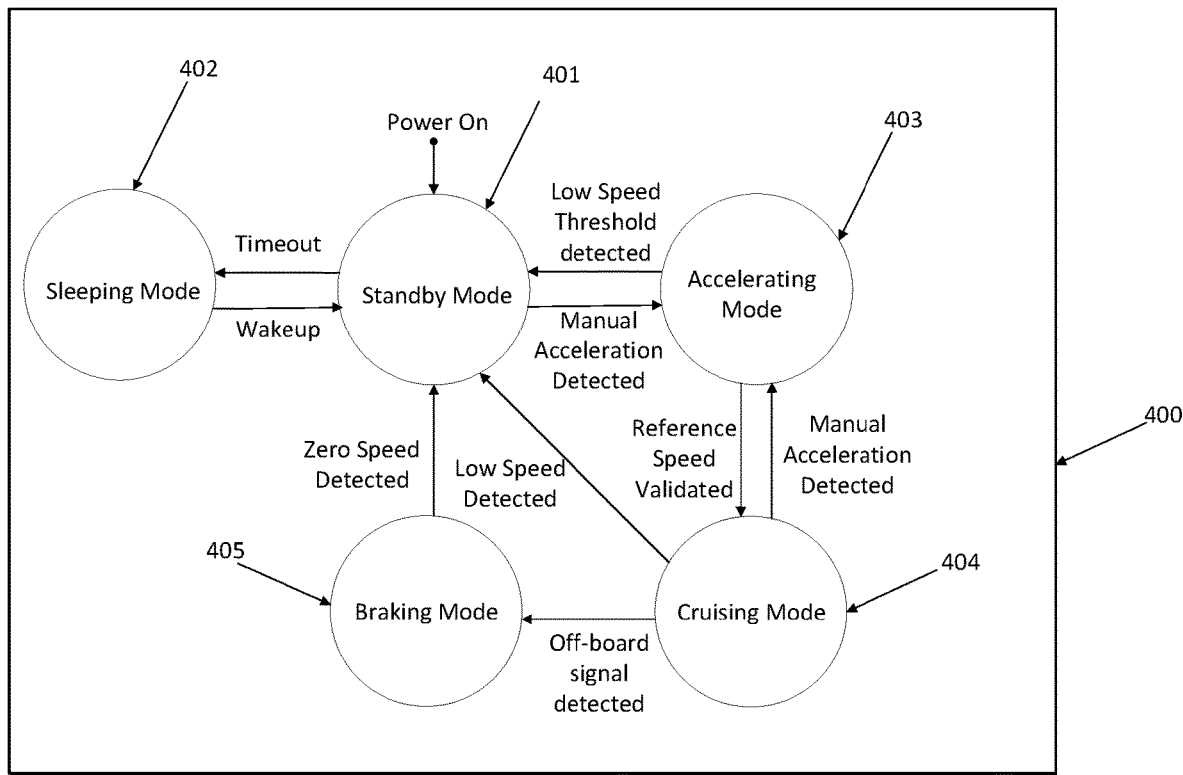
FIG. 4 shows a flow chart in accordance with the present disclosure.
Figure 5A:
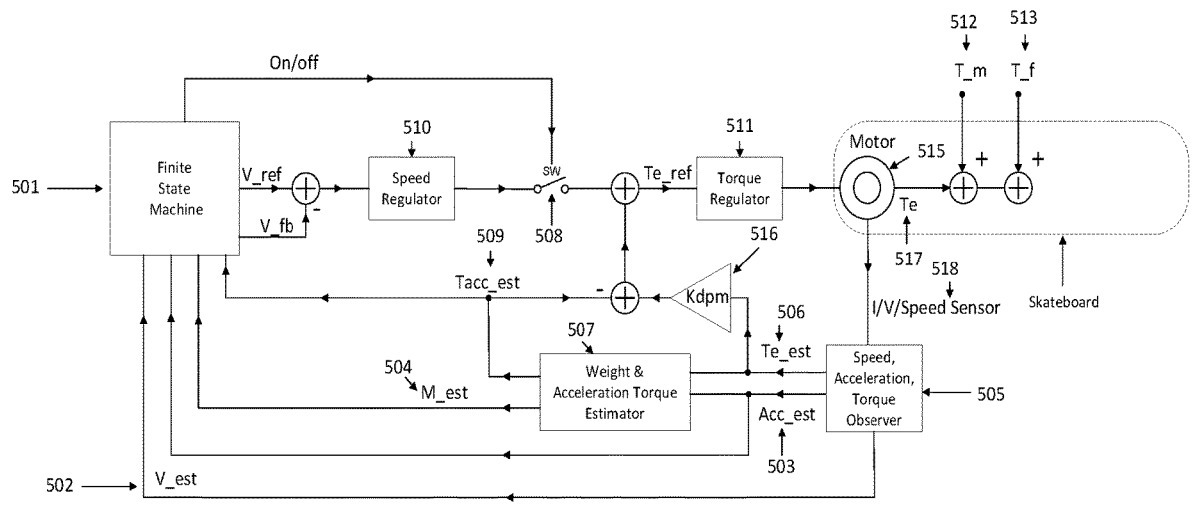
FIGS. 5A and 5B each show a control scheme in accordance with the present disclosure.
Figure 5B:
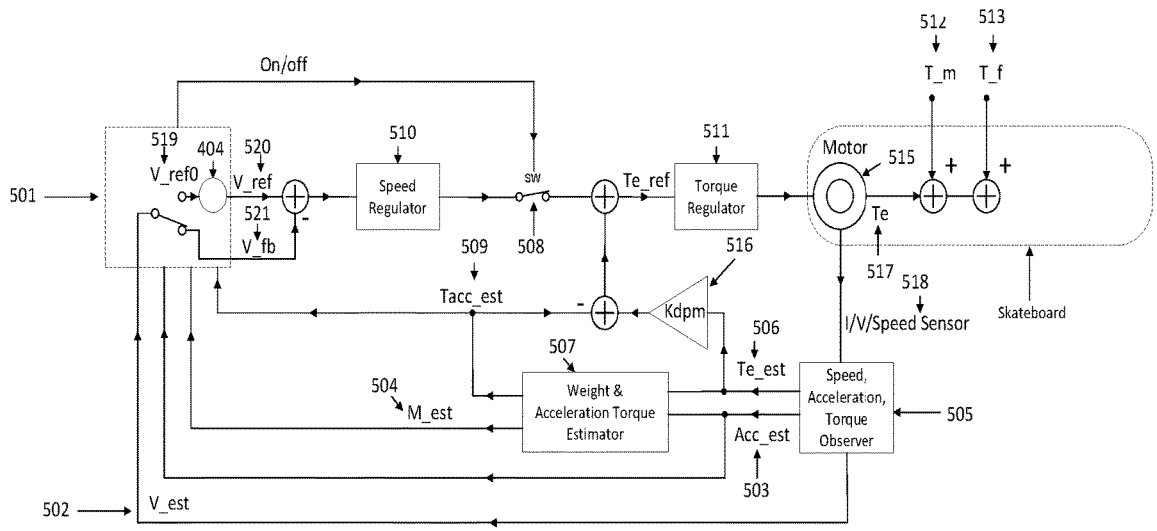

FIG. 4 shows different running modes available to the electric skateboard while FIGS. 5A and 5B show the state flow and control schemes that the electric control unit 102 operates with microcontroller unit 111. The state flow 400, shown in FIG. 4, runs in the form of a finite state machine 501 (FIG. 5A or FIG. 5B).

As shown in FIG. 4, there are five running modes managed by the finite state machine 501 for the skateboard: standby mode 401, sleeping mode 402, accelerating mode 403, cruising mode 404, and braking mode 405.

The finite state machine 501 manages the mode switch for a number of purposes such as torque or speed control. For example, when the power ON/OFF switch 116 is switched to ON, the microcontroller unit 111 is powered up to run under standby mode 401 which can take care of housekeeping functions such as electric control unit self-diagnostic and hub motor speed monitoring. More specifically, these can include supervision and protection against overheating, over or under voltage protection, over current protection, keeps the motor driving idle, and the like. The microcontroller unit 111 can also determine if the wakeup signal 117 is authenticated by monitoring BEMF signal 116 to detect the motor's back-EMF level for redundancy since a false trigger of wakeup signal 117 may occur due to unexpected electric noise from BEMF sensing module 115.

Exit from standby mode 401 can be enabled by, for example, timeout control. A timeout clocking is triggered when the standby mode 401 is activated. Once a timeout period is met (e.g., 3 seconds) and no new wakeup signal is captured, the finite state machine 501 switches to the sleeping mode 402. The sleeping mode 402 puts the microcontroller unit 111 to an ultra-low power mode to minimize power consumption of electric control unit 102 until a new wakeup signal 117 wakes up the microcontroller unit 111 back to standby mode 401.

Another exit of the standby mode 401 can be gated by wakeup signal 117 and input Acc_est 503 which is the estimated acceleration value calculated by Speed, Acceleration, Torque Observer module 505. While the wakeup signal 117 remains active, Acc_est 503 is compared with a threshold value for a certain period of time. If the absolute value of Acc_est 503 stays above the threshold during this period, the finite state machine 501 switches from the standby mode 401 to the accelerating mode 403.

When the finite state machine 501 runs under the accelerating mode 403, the one or more of the hub motor(s) 108 can be activated by the electric control unit 102 to output motor electric torque, Te 517, from motor(s). The corresponding motor torque control schemes (FIGS. 5A-5B) features several modules: Speed, Acceleration, Torque Observer 505, Weight & Acceleration Torque Estimator 507, virtual switch 508, and Torque Regulator 511. The virtual switch 508 stays OFF during the accelerating mode 403. The current, voltage, and speed inputs 518 for motor running signals are routed to Speed, Acceleration, Torque Observer 505, which outputs the estimated values of motor speed, V_est 502, acceleration, Acc_est 503, and motor electric torque, Te_est 506. Estimated acceleration, Acc_est 503 and estimated motor electric torque Te_est 506 output values are then routed to Weight & Acceleration Torque Estimator 507 to generate the estimated values of total weight of rider and skateboard, M_est 504, and total torque contributing to the estimated acceleration, Tacc_est 509.

During acceleration mode 403, M_est 504 is initialized with a preconfigured value that does not have to be close to the actual weight that it represents. Online tuning for M_est 504 will be activated by Weight & Acceleration Torque Estimator 507 when the finite state machine 501 switches to the cruising mode 404.

The torque regulator module 511 is a closed-loop controller that regulates the motor electric torque, Te 517, to follow the reference torque command Te_ref. The torque regulator 511 can be implemented in the form of any linear or non-linear based controller, such as a Proportion-Integration Controller (PI Controller), or Sliding Mode Controller, usually with the feedback of motor phase currents. Since the virtual switch 508 stays OFF during the accelerating mode 403, reference input Te_ref fed to the torque regulator 511 is defined by the following equation:

$$T\_ref = Kdmp^*Te\_est - Tacc\_est \quad (1)$$

where Kdpm is a configurable unitless value. Kdpm can be adjusted based on needs of running modes. The torque regulator 511 regulates the motor electric torque Te 501 from the hub motor(s) in the proportion of (1−Kdpm) to the total mechanical force that contributes to the acceleration. When the value of Kdpm ranges from 0~1, it acts as a damping factor (1−Kdpm) to reduce the estimated acceleration rate, Acc_est 503.

Therefore, when the rider starts up the skateboard using manual force, this damping factor can be configured to control the acceleration rate of the skateboard to the desired level and make the startup process comfortable and safe. It is usually challenging for a beginning rider to jump onto the skateboard because the conventional skateboards or e-skateboards are apt to slip leading the rider to fall easily. This is largely due to the resistance coefficient of concrete surface being about 0.002-0.003. To compensate, the Kdpm can be set to 0.7, delivering a damping factor of 0.3 (1−0.7=0.3) while the rider accelerates the skateboard. The rider will "feel" or perceive that the skateboard is rolling on a surface with a resistance coefficient of 0.3. Raising the resistance coefficient level to ~0.3 should be sufficient to reduce unexpected falls for most beginners.

As alluded to earlier, it is possible to harvest the damping energy from the manual propelling force to recharge the power battery 104 during the acceleration process. This enables the electric skateboard riders to recharge the battery during the ride and increase the battery mileage. Moreover, an option can be provided for riders to recharge the battery manually by configuring Kdpm to 0 for the highest damping factor 1 (1−0=1), which means that the rider's total manual force to accelerate the skateboard is harvested to recharge the battery. The acceleration Acc is canceled out by the electric motor torque Te from the hub motor 108 until the electric motor torque reaches its maximum output, which is usually limited by the current capacity of the DC-AC converter 106 and the hub motor 108. Damping factor (Kdpm) 516 can also be configure to a value higher than 1. For example, when Kdpm is set to 1.2, the torque Te 501 delivered by the hub motor(s) is assisting the rider with about an addition of 20% of the total force from the rider to accelerate the skateboard, on top of their own manual force. The configuration may be preferred for the skillful skateboard riders who would like to have a quicker startup with the assistance of hub motor for accelerating.

As soon as the acceleration rate is reduced to a low threshold level, the state machine exits the accelerating mode 403 and switches to the cruising mode 404; meanwhile, the immediate estimated speed value V_est 502 is captured and latched as the reference speed V_ref0 519, while the V_est 502 signal is connected to V_fb 521 to act as the feedback channel for cruising control, as shown in FIG. 5B. Virtual switch 508 is put to ON state during the cruising mode 404. FIG. 5B illustrates the cruising control scheme implemented. Once the cruising mode is activated, the speed regulator 510 kicks in to work together with the motor torque control, as illustrated by FIG. 5A. The speed reference input V_ref 520 to regulator 510 is populated in the method as described by the equation below:

$$V\_ref = V\_ref0 + \int (\mu^* G) dt \quad (2)$$

where G is the gravity constant and is a factor for virtual rolling resistant coefficient control, usually being configured in the range of −0.5~0. In the equation above, the integration can be discretized into different operation forms in accordance with the sampling frequency for speed control. The virtual rolling resistant coefficient can be configured to simulate the resistant coefficient that the skateboard is rolling on different surfaces. For example, if it is configured to a value around −0.0002, the speed control shown in FIG. 5B simulates the skating experience on an ice surface. If it is configured to the range of −0.004~−0.002, the skating experience on a concrete surface is simulated.

Another aspect of the cruising control mode 403 is that the Weight & Acceleration Torque Estimator 507 can estimate the total weight of the skateboard and the rider, M_est 504. Based on inputs Te_est 506 and Acc_est 503, the estimation can be calculated by the following equation:

$$M\_est = Te\_est/(Acc\_est + \beta * G * R) \quad (3)$$

$$M_{est} = \frac{Te\_est}{Acc_{est} * R^2 + \beta * G * R}$$

where β is the resistance coefficient for the skating surface; G is the gravity constant; and R is the radius of the skateboard wheel. The estimated value of M_est 504 can be used to calibrate its initial value that is configured for the accelerating mode 403, as mentioned previously.

The finite state machine 501 provides three exit channels for the cruising mode 404 to switch into the braking mode 405, the standby mode 401, or the accelerating mode 403. One exit channel is triggered when M_est 504 is detected. For example, when M_est 504 falls below to a certain low threshold, the finite state machine 501 assumes that the rider stepped off the skateboard and switches to braking mode 405. Braking mode 405 ramps down the value of V_ref to zero quickly, then switches to standby mode 401. The second exit channel is triggered when the speed reference value V_ref is lower than a low threshold value causing the finite state machine 501 to switch to standby mode 401. The switch 508 is turned to OFF mode once the standby mode 401 takes over the control follow. The third exit channel is triggered when a positive value of M_est 504 is validated, the state machine switches to the accelerating mode 403.

Figure 1B:
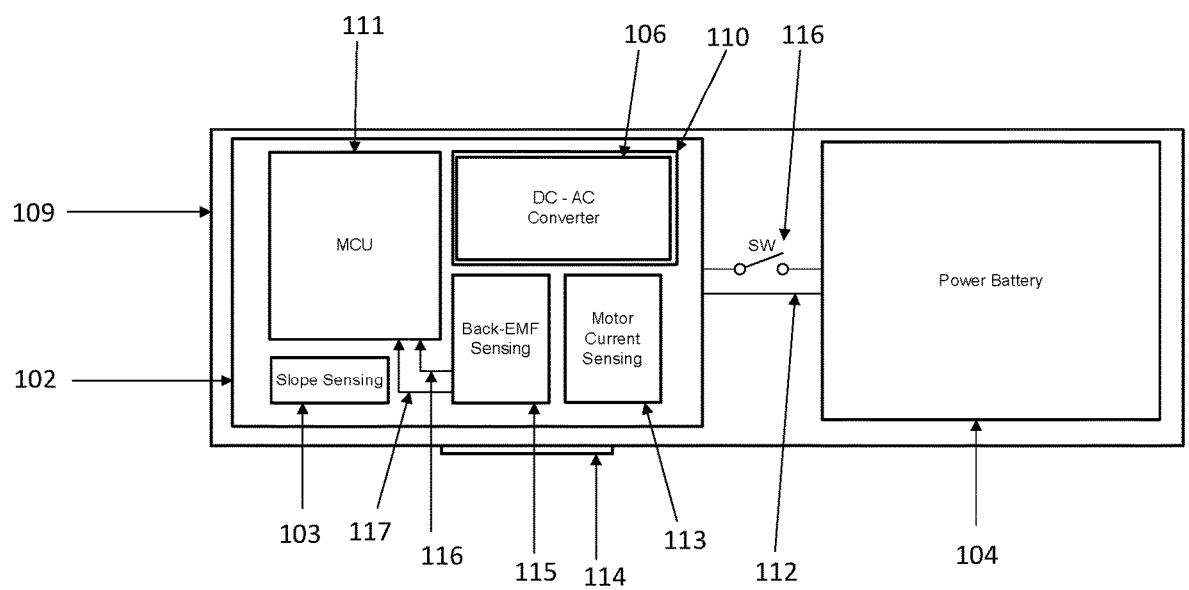
FIG. 1B shows internals of the electronic control unit and battery module in accordance with the present disclosure.
Figure 6:
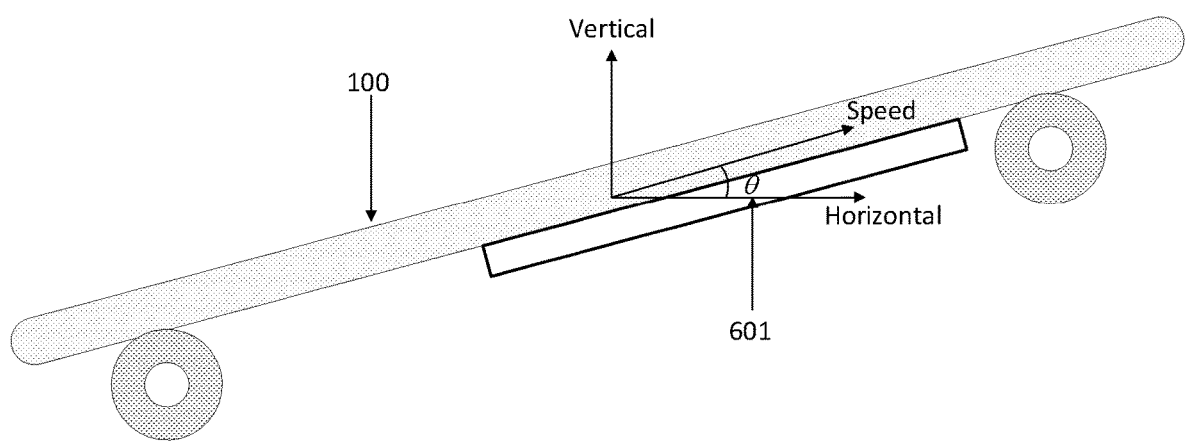
FIG. 6 shows parameters of slope angle detection in accordance with the present disclosure.

Equation (3) assumes the skateboard runs on a horizontal surface. Once it runs on the surface with a slope angle of 601, as illustrated in FIG. 6, the equation (3) changes to (4):

$$M_{est} = \frac{Te\_est}{Acc_{est} * R^2 + (\beta * \cos\theta + \sin\theta) * G * R} \quad (4)$$

where θ 601 is the angle between the horizontal level and the speed direction. This angle is sensed by the slope sensing module 103 and processed by microcontroller unit 111, as shown in FIG. 1B. If the speed direction is above the horizontal level, θ 601 is a positive angle. Below the horizontal level, θ 601 is a negative angle.

With the description of the control system above, this disclosure provides adaptive control of electric skateboard to coordinate the rider's manual force for skating with the torque force delivered by the hub motor(s) without needing a dedicated man-machine interface such as a remote control to operate the skateboard. This approach allows for much smaller hub motor(s) as well as smaller battery pack (in size and weight) compared to conventional electric skateboard, which in turn, lowers bill of materials (BOM) cost for manufacturing while making the electric skateboard easier and more portable to use.

Aspects of this disclosure include, but are not limited to the following embodiments:

An electronic control device for an electric skateboard that obviates the need for remote control, the device comprising: one or more hub motor integrated into a wheel hub or coupled to an axle of the electric skateboard; and electric control unit that detects speed or acceleration of the hub motor and adaptively controls speed or torque of the hub motor based on feedback from rider's manual operation of the skateboard.

The electronic control device, wherein the electronic control device manages a damping factor that affects rider's perceived resistance coefficient of a surface.

The electronic control device, wherein the electronic control device utilizes a finite state system to manage the state flow of the electronic control device.

The electronic control device, further comprising: electric circuit; microcontroller unit; or one or more Hall-Effector sensor, wherein the electric circuit takes back-EMF signal from the hub motor or the Hall-Effector position signal from the hub motor as input and generates an output signal for the microcontroller unit to put the electronic control device in active operation mode or sleeping mode.

The electronic control device, wherein the electronic control device is configured with an algorithm that calculates speed, acceleration, or electric torque of the hub motor.

The electronic control device, wherein the electronic control device is configured with an algorithm that calculates skateboard rider's manual propelling force, weight, or specified speed.

The electronic control device, wherein the electronic control device is configured with an algorithm that compensates the manual propelling force by driving the hub motor to output a resistant electric torque to safely limit acceleration rate of the skateboard at startup.

The electronic control device, wherein the electronic control device is configured with an algorithm that compensates the manual propelling force by driving the hub motor to output a propelling electric torque to compensate for deceleration rate of the skateboard to keep the electric skateboard at the specified speed.

The electronic control device, wherein the electronic control device is configured with an algorithm that provides a speed closed-loop control to drive the hub motor to keep the electric skateboard at an adaptively calculated speed.

The electronic control device, wherein the electronic control device is configured with an algorithm that slows down or stops the electric skateboard without use of a weight sensor.

The electronic control device, wherein the electronic control device is configured with an algorithm that puts the microcontroller unit in sleep mode to minimize electric power consumption of by leveraging speed or acceleration derived from the hub motor.

The electronic control device, wherein electronic control device is configured with an algorithm that conserves the power battery by controlling the skateboard using speed or acceleration calculated from the hub motor.

A method of adaptive control of an electric skateboard without use of a separate controller, the method comprising: providing an electronic control device comprising an electric control unit and a power battery, wherein the electric control unit is coupled of a hub motor installed on the electric skateboard, wherein the electronic control device is configured with an algorithm that calculates one or more parameters of the electric skateboard and provides a compensation input to the hub motor.

The method of adaptive control, wherein the controller is a remote controller.

The method of adaptive control, wherein the compensation input is a target speed, target acceleration rate, or target deceleration rate of the electric skateboard.

The method of adaptive control, wherein the algorithm calculates speed, acceleration, or electric torque of the hub motor.

The method of adaptive control, wherein the algorithm calculates skateboard rider's manual propelling force, weight, or specified speed.

The method of adaptive control, wherein the algorithm compensates the manual propelling force by driving the hub motor to output a resistant electric torque to safely limit acceleration rate of the skateboard at startup.

The method of adaptive control, wherein the electronic control device manages a damping factor that affects rider's perceived resistance coefficient of a surface.

The method of adaptive control, wherein the electronic control device utilizes a finite state system to manage the state flow of the electronic control device.

Modifications are possible in the described embodiments, and other embodiments are possible, within the scope of the claims. The term 'a' or 'an' as used in the claims does not exclude a plurality. A unit or other means may fulfill the functions of several units or means recited in the claims.

The invention claimed is:

1. An electronic control device for an electric skateboard that obviates the need for remote control, the device comprising:

one or more hub motor integrated into a wheel hub or coupled to an axle of the electric skateboard; and electric control unit that detects speed or acceleration of the hub motor and adaptively controls speed or torque of the hub motor based on feedback from rider's manual operation of the skateboard, wherein the electronic control device is configured with an algorithm that calculates skateboard rider's manual propelling force, weight, or specified speed and an algorithm that compensates the manual propelling force by driving the hub motor to output a resistant electric torque to safely limit acceleration rate of the skateboard at startup.

2. The electronic control device of claim 1, wherein the electronic control device manages a damping factor that affects rider's perceived resistance coefficient of a surface.

3. The electronic control device of claim 1, wherein the electronic control device utilizes a finite state system to manage the state flow of the electronic control device.

4. The electronic control device of claim 1, further comprising:
electric circuit;
microcontroller unit; or
one or more Hall-Effector sensor, wherein the electric circuit takes back-EMF signal from the hub motor or the Hall-Effector position signal from the hub motor as input and generates an output signal for the microcontroller unit to put the electronic control device in active operation mode or sleeping mode.

5. The electronic control device of claim 1, wherein the electronic control device is configured with an algorithm that calculates speed, acceleration, or electric torque of the hub motor.

6. The electronic control device of claim 1, wherein the electronic control device is configured with an algorithm that compensates the manual propelling force by driving the hub motor to output a propelling electric torque to compensate for deceleration rate of the skateboard to keep the electric skateboard at the specified speed.

7. The electronic control device of claim 1, wherein the electronic control device is configured with an algorithm that provides a speed closed-loop control to drive the hub motor to keep the electric skateboard at an adaptively calculated speed.

8. The electronic control device of claim 1, wherein the electronic control device is configured with an algorithm that slows down or stops the electric skateboard without use of a weight sensor.

9. The electronic control device of claim 1, wherein the electronic control device is configured with an algorithm that puts the microcontroller unit in sleep mode to minimize electric power consumption of by leveraging speed or acceleration derived from the hub motor.

10. The electronic control device of claim 1, wherein electronic control device is configured with an algorithm that conserves the power battery by controlling the skateboard using speed or acceleration calculated from the hub motor.

11. A method of adaptive control of an electric skateboard without use of a separate controller, the method comprising:
providing an electronic control device comprising an electric control unit and a power battery, wherein the electric control unit is coupled of a hub motor installed on the electric skateboard, wherein the electronic control device is configured with an algorithm that calculates one or more parameters of the electric skateboard and provides a compensation input to the hub motor,
wherein the electronic control device manages a damping factor that affects rider's perceived resistance coefficient of a surface.

12. The method of claim 11, wherein the controller is a remote controller.

13. The method of claim 11, wherein the compensation input is a target speed, target acceleration rate, or target deceleration rate of the electric skateboard.

14. The method of claim 11, wherein the algorithm calculates speed, acceleration, or electric torque of the hub motor.

15. The method of claim 11, wherein the algorithm calculates skateboard rider's manual propelling force, weight, or specified speed.

16. The method of claim 11, wherein the algorithm compensates the manual propelling force by driving the hub motor to output a resistant electric torque to safely limit acceleration rate of the skateboard at startup.

17. The method of claim 11, wherein the electronic control device utilizes a finite state system to manage the state flow of the electronic control device.

* * * * *